United States Patent
Diez

(10) Patent No.: US 6,408,528 B1
(45) Date of Patent: Jun. 25, 2002

(54) METHOD AND APPARATUS FOR DETERMINING THE IMPRESSING DEPTH OF A TIRE ON A MOTOR VEHICLE DISK WHEEL

(75) Inventor: Ulrich Diez, Reichshof (DE)

(73) Assignee: Hofmann Werkstatt-Technik GmbH, Pfungstadt (DE)

( * ) Notice: Subject to any disclaimer, the term of this patent is extended or adjusted under 35 U.S.C. 154(b) by 0 days.

(21) Appl. No.: 09/248,990

(22) Filed: Feb. 12, 1999

(30) Foreign Application Priority Data

Feb. 12, 1998 (DE) .......................... 198 05 779

(51) Int. Cl.⁷ .......................... G01B 11/26; G01B 5/20; G01D 21/00
(52) U.S. Cl. .......................... 33/203.12; 33/203; 33/600
(58) Field of Search .......................... 33/600, 203.18, 33/203.19, 203.2, 203, 203.1, 203.12, 203.15, 203.16, 203.17, 645, 613, 783, 787

(56) References Cited

U.S. PATENT DOCUMENTS

| 3,636,773 A | * | 1/1972 | Harant | 73/466 |
| 4,290,205 A | * | 9/1981 | Holm | 33/203 |
| 4,576,044 A | * | 3/1986 | Boni | 33/203.19 |
| 4,953,307 A | * | 9/1990 | Loucas | 33/203.18 |
| 5,054,918 A | * | 10/1991 | Downing et al. | 33/203 |
| 5,377,542 A | * | 1/1995 | McConnell et al. | 73/462 |
| 5,429,422 A | * | 7/1995 | Baldi | 301/65 |
| 5,443,537 A | * | 8/1995 | Haskins | 33/203.18 |
| 5,553,389 A | * | 9/1996 | Winslow et al. | 33/203.18 |
| 5,586,062 A | * | 12/1996 | Colarelli, III | 33/203.18 |
| 5,587,528 A | * | 12/1996 | Rothamel et al. | 73/462 |
| 5,724,743 A | * | 3/1998 | Jackson | 33/203.18 |
| 5,915,274 A | * | 6/1999 | Douglas | 301/5.21 |
| 5,943,783 A | * | 8/1999 | Jackson | 33/203.18 |
| 5,948,024 A | * | 9/1999 | O'Mahoney et al. | 33/203.18 |
| 5,999,867 A | * | 12/1999 | Rogers et al. | 33/203.18 |
| 6,035,729 A | * | 3/2000 | Weinmann | 33/203 |

FOREIGN PATENT DOCUMENTS

| EP | 0358496 A2 | 9/1989 |
| EP | 0468369 A2 | 7/1991 |
| EP | 06001112 | 1/1994 |

* cited by examiner

Primary Examiner—Diego Gutierrez
Assistant Examiner—Yaritza Guadalupe
(74) Attorney, Agent, or Firm—Shook Hardy & Bacon

(57) ABSTRACT

In a method and apparatus for determining the impressing depth of a tire on a motor vehicle disk wheel, the impressing depth is determined using a wheel balancing machine structure from the wheel rim width, the axial spacing of an abutment surface on the main mounting shaft of the machine from a reference plane of the machine, and the axial spacing of one of the two measurement points for the wheel rim width from the reference plane.

10 Claims, 1 Drawing Sheet

METHOD AND APPARATUS FOR DETERMINING THE IMPRESSING DEPTH OF A TIRE ON A MOTOR VEHICLE DISK WHEEL

FIELD OF THE INVENTION

The invention concerns a method and an apparatus for determining the impressing depth of a tire on a motor vehicle wheel.

In this specification the term impressing with of a disk wheel of a motor vehicle is used to denote the axial spacing between the inside surface of the disk portion of the wheel, being the surface which in the mounted condition of the wheel bears against a mounting surface on the hub of an axle of a motor vehicle, and the center of the rim width. That dimension can also be referred to as rim offset.

BACKGROUND OF THE INVENTION

When converting the tires fitted to motor vehicles, in particular to change over to wide tires, rims or disk wheels with different impressing depths for the front and rear axles of the vehicle are frequently used when fitting the new tires to the motor vehicle wheels. As however the disk wheels involved are often of the same external appearance, there may be a risk of confusion occurring between them, so that the front and rear axles of the vehicle are fitted with the wrong wheels.

SUMMARY OF THE INVENTION

An object of the present invention is to provide a method of determining the impressing depth of a tire on a motor vehicle disk wheel, with which that dimension can be easily and reliably ascertained.

Another object of the present invention is to provide a method of determining the impressing depth on a motor vehicle disk wheel, which can be carried into effect by a simple operating procedure which can be implemented quickly and which gives accurate measurement results.

Still another object of the present invention is to provide an apparatus for determining the impressing depth of a tire on a motor vehicle disk wheel which while being of simple structure affords rapid and reliably accurate results.

In accordance with the principles of the present invention in the method aspect the foregoing and other objects are attained by a method of determining the impressing depth of a tire on a motor vehicle disk wheel, wherein the disk wheel is arranged on a main shaft of a wheel balancing machine, with the disk wheel having its inside disk surface bearing against an abutment surface which is fixed with respect to the shaft. The rim width of the disk wheel is ascertained. The impressing depth is determined from the rim width and the respective spacing of the abutment surface and a measurement point at the rim from a reference plane on the machine. The measurement point at the rim can be one of the two rim flanges of the disk wheel or measurement points of the rim width.

In the apparatus aspect the foregoing and other objects are attained by an apparatus for determining the impressing depth of a tire on a motor vehicle disk wheel, comprising a wheel balancing machine structure having a main shaft for mounting a motor vehicle wheel thereon, and sensing means for sensing geometrical data of the wheel mounted on the main shaft and for determining axial spacings of given parts of the wheel with respect to a reference plane of the machine. The apparatus further includes an evaluation means for determining at least one balancing vector such as balancing mass or balancing angular position in dependence on the ascertained geometrical wheel data and measurement values obtained during a measurement operation. A display means is provided for effecting balancing of the wheel. The apparatus further includes a computing means connected to the evaluation means, and operable to compute the impressing depth from the respective axial spacing of a measurement point at the rim of the wheel and the abutment surface on the machine main shaft against which the wheel is mounted, from the reference plane, and the rim width. The measurement point at the rim of the wheel may be one of the rim flanges or measurement points of the rim width.

As will be seen in greater detail from preferred embodiments of the invention which are described hereinafter, the invention involves the use of a wheel balancing machine which is required in any case in a motor vehicle workshop. The sensing means of the apparatus for determining the geometrical data of the wheel which are required for setting the electronic evaluation system of the wheel balancing machine to the respective motor vehicle wheel to be balanced, and the geometrical data, can also be employed for the purposes of the invention.

In accordance with the invention therefore the impressing depth can be ascertained from the wheel rim width and the spacing between an abutment surface, in particular of a disk-shaped configuration, which is provided on the main shaft of the wheel balancing machine and which extends perpendicularly to the axis of rotation of the main shaft and against which the disk wheel bears with the inside mounting surface of its disk portion in the unbalance measuring operation, and a reference plane which is fixed with respect to the machine, and also from the spacing between for example one of the two rim flanges of the wheel or one of the two measurement points for the rim width, and the above-mentioned reference plane.

The reference plane referred to above can be the plane from which the spacings of the motor vehicle wheel to be balanced, its rim flanges, and its balancing planes are ascertained, for example by operation of suitable sensing means. Sensing means of that kind, for example in the form of a rim width sensing device or in the form of measuring sensing members mounted displaceably on the balancing machine for sensing the inner and outer rim flanges of a wheel can be found for example in the operating instructions for the Geodyna 88/88 m wheel balancing machine from Hofmann, imprint 941214509.86.

The above-mentioned geometrical data which are inputted into the electronic evaluation system for determining the respective balancing vector involved in the corresponding balancing plane on the motor vehicle wheel can be evaluated to determine the impressing depth of the wheel and can be displayed by a display unit provided on the machine. In that way the service operator is given information as to the axle, either the front axle or the rear axle, of the motor vehicle, at which the motor vehicle wheel which is possibly being balanced at the same time has to be mounted.

Further objects, features and advantages of the invention will be apparent from the following description of preferred embodiments thereof.

DESCRIPTION OF PREFERRED EMBODIMENTS

Figures 1, 2:
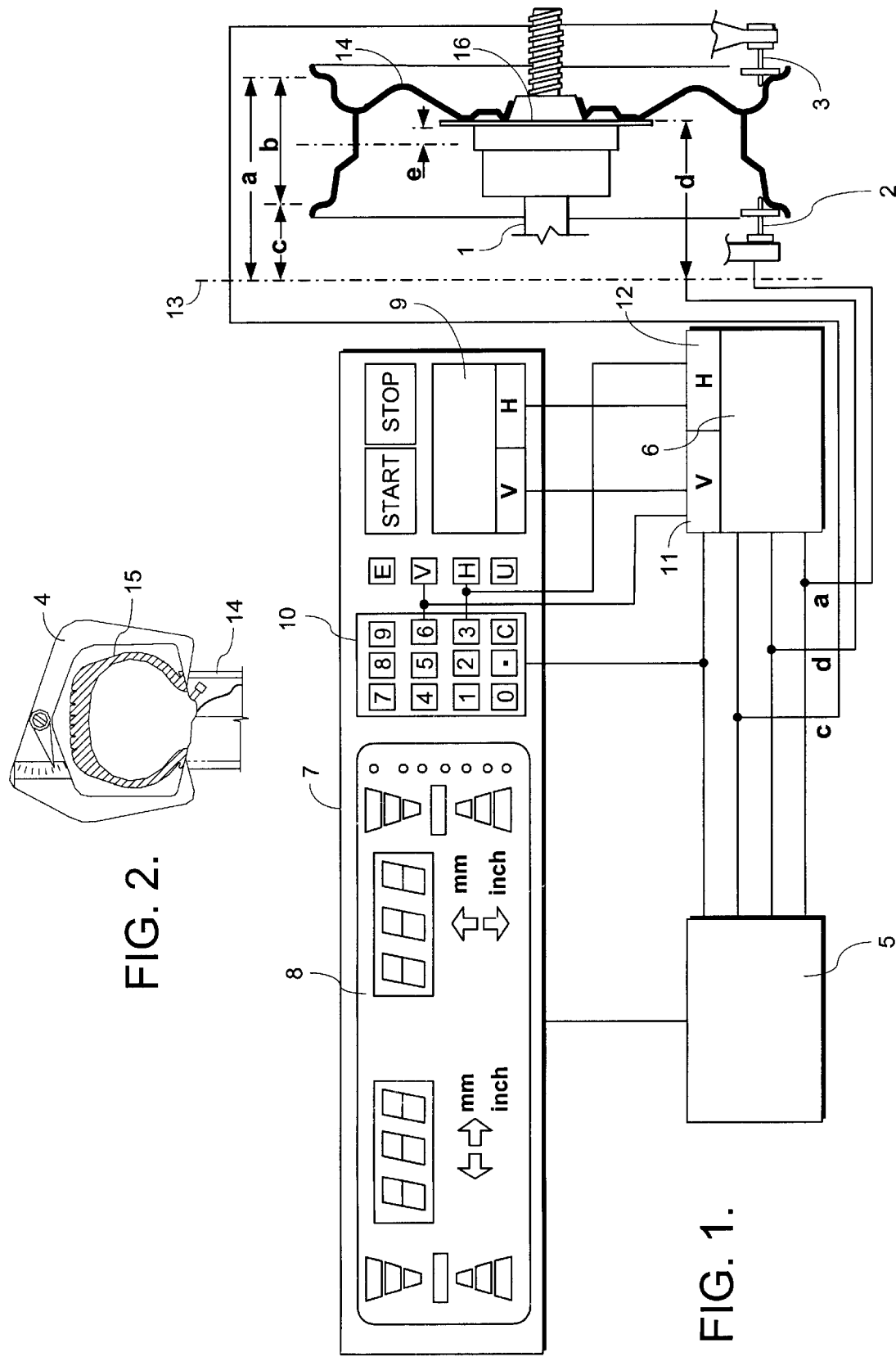
FIG. 1 diagrammatically shows the equipment for determining impressing depth, which is required on a balancing machine with a motor vehicle wheel mounted in position thereon, for ascertaining the wheel data.
FIG. 2 shows a further possible mode of determining wheel data.

Referring firstly to FIG. 1, the impressing depth E of a disk wheel as indicated generally at 14 of a motor vehicle (not shown) is defined by the axial spacing of the inside surface of the disk portion constituting a mounting surface which bears against a corresponding mounting surface on a hub of an axle of a motor vehicle when the wheel is fitted thereon, relative to the center of the rim width as indicated at b in FIG. 1. To determine that impressing depth of a disk wheel 14, the invention provides for the use of a wheel balancing machine. For that purpose, the disk wheel 14, possibly with a tire 15 fitted thereon, is suitably mounted on a main shaft 1 of the wheel balancing machine, in the position shown in FIG. 1. In that case the inward face of the disk portion of the wheel bears against an abutment surface 16 which is fixed with respect to the main shaft 1 and which extends perpendicularly with respect to the axis of rotation thereof. The abutment surface 16 can disposed on a mounting flange which serves for fixedly mounting the motor vehicle wheel on the main shaft 1 of the balancing machine. A spacing as indicated at d, between the abutment surface 16 and a reference plane diagrammatically indicated at 13, is a machine-related parameter and can be sensed or it can be fixedly predetermined in an electronic evaluation system generally indicated at 5 in FIG. 1, of the wheel balancing machine.

In the usual way the wheel balancing machine also has measuring sensing members 2 and 3 for implementing spacing measurements at the axially outer and inner rim flanges of disk wheel 14. By making use of the measuring sensing members 2 and 3, it is possible to determine nominal rim dimensions, more especially the rim width as indicated at b, by the measurement of the spacing from the reference plane 13. For that purpose, it is possible to measure the axial spacing a of the axially outer rim flange from the reference plane 13 and the axial spacing c of the axially inward rim flange from the reference plane 13, so that the rim width b can be determined by forming the difference between the values of a and c. In the sensing operation, the outwardly facing parts of the rim flanges are sensed. Accordingly, the nominal rim dimension of the rim width b is ascertained by operation of the electronic evaluation system 5, taking into account the thickness of the material of the rim or each of the respective rim flanges.

Reference will be made at this point to FIG. 2 showing that the rim width b may also be determined directly by means of a rim width sensing device indicated at 4 in FIG. 2. The measured parameter can then be inputted into the electronic evaluation system 5 of the machine by way of a keypad 10.

The above-mentioned axial spacings a and c sensed by the measuring sensing members 2 and 3 are simultaneously inputted to a computing means 6 for computing the impressing depth of the disk wheel 14. If the axial spacing d of the abutment surface 16 from the reference plane 13 is sensed, that parameter is also fed to the computing means 6. If that axial spacing d is predetermined in the electronic evaluation system 15, it can be called up therefrom in the operation of computing the impressing depth E by the computing means 6.

If the rim width b is sensed by means of the rim width sensing device indicated at 4 in FIG. 2, the keypad 10 is operated to feed the rim width b both to the electronic evaluation system 5 and also to the computing means 6.

Calculation of the impressing depth E can be implemented by calculation in accordance with one of the two formulae (1) and (2) set out below:

$$E = d - \frac{b}{2} - c \qquad (1)$$

$$E = d + \frac{b}{2} - a \qquad (2)$$

In the computation ir accordance with formula (1) the axial spacing c of the axially inward rim flange or rim width measurement point is taken into consideration, while in the computation in accordance with formula (2), the axial spacing a of the axially outward rim flange or the outward measurement point for the rim width b is taken into consideration. Both modes of computation involve using the axial spacing d of the abutment surface 16 which extends perpendicularly to the axis of the main shaft 1, from the reference plane 13, together with the rim width b.

The impressing depth E which is calculated in the computing means 6 can be displayed in a display panel 9 of a display unit 7 which also includes a display panel 8 for display in the balancing operation, connected to the electronic evaluation system 5. For example the absolute value of the impressing depth E can be digitally displayed in the display panel 9. It is also possible to provide a display specifying whether the wheel has to be mounted on the front axle as indicated at V or the rear axle as indicated at H.

If the impressing depths for the wheels for the front axle and for the wheels for the rear axle are known, they can be previously inputted into memories 11 and 12 by operation of the keypad 10. In order to have the correct association in the memories 11 and 12 suitable keys can be provided for that purpose on the display panel unit. In the procedure for computation of the appropriate impressing depth of the disk wheel 14 which is mounted on the main shaft 1, then, after comparison with the corresponding values in the memories 11 and 12 an associated display, for example V for the front axle and H for the rear axle or another form of indication, can make it clear to the service operator where the wheel, which is possibly also being balanced, is to be subsequently mounted to the motor vehicle. The display operating panel of the display unit 7 may include an actuation key as indicated at E for initiation of the procedure for computation of the impressing depth E by the computing means 6, and a key U for computation of the balancing vectors in the corresponding balancing planes of the disk wheel 14.

It will be appreciated that the above-described embodiments of the method and apparatus according to the present invention have been set forth solely by way of example and illustration thereof and that various other modifications and alternations may be made therein without thereby departing from the spirit and scope of the invention.

What is claimed is:
1. A method for determining an impressing depth of a tire on a motor vehicle disk wheel, the method comprising:
   arranging the disk wheel on a main shaft of a wheel balancing machine, the wheel balancing machine defining a reference plane;
   bearing a hub mounting surface of a disk portion of the disk wheel against an abutment surface that is fixed to the main shaft of the wheel balancing machine;
   measuring a distance from said abutment surface to said reference plane;

measuring axial distances of outward and inward measuring points of a rim of said disk wheel from said reference plane;

acertaining a width of said rim of the disk wheel;

imputing said ascertained and measured distances and said width of the rim into a computer, and using the computer, determining the impressing depth with the values of said input distances and width in accordance with one of two formulae that follow:

$$E=d-b/2-c;$$

and $$E=d+b/2-a;$$

wherein

E=the impressing depth;

d=the measured distance from the abutment surface to the reference plane of the wheel balancing machine;

b=the width of the rim;

a=the measured distance from the outward measuring point of the rim to the reference plane of the wheel balancing machine; and c=the measured distance from the inward measuring point of the rim to the reference plane of the wheel balancing machine.

2. A method as set forth in claim 1, wherein the rim includes inner and outer flanges and the distances (a) and (c) are measured from the inner and outer flanges of the rim.

3. A method as set forth in claim 1, further comprising providing a display.

4. A method as set forth in claim 3, wherein the impressing depth is exhibited on the display.

5. A method as set forth in claim 3, wherein an arrangement of the disk wheel on the vehicle is exhibited on the display.

6. An apparatus for determining an impressing depth of a tire on a motor vehicle disk wheel, comprising:

a balancing machine having a main shaft on which the disk wheel is arranged, an abutment surface that is fixed to the main shaft, and against which a hub mounting surface of a disk portion of the disk wheel is borne, a reference plane defined on said balancing machine, means for ascertaining a distance from said abutment surface to said reference plane, sensing means for measuring axial distances of outward and inward measuring points of a rim of said disk wheel from said reference plane, means for ascertaining a width of said rim of the disk wheel;

a computer in communication with said balancing machine, the computer using the width of the rim of the disk wheel and said distances from said abutment surface and from the outward and inward measuring points of the rim to said reference plane of the balancing machine to determine the impressing depth in accordance with one of two formulae that follow:

$$E=d-b/2-c;$$

and $$E=d+b/2-a;$$

wherein

E=the impressing depth;

d=the ascertained distance from the abutment surface to the reference plane of the wheel balancing machine;

b=the width of the rim;

a=the measured distance from the outward measuring point of the rim to the reference plane of the wheel balancing machine; and c=the measured distance from the inward measuring point of the rim to the reference plane of the wheel balancing machine.

7. An apparatus as set forth in claim 6, wherein said rim includes inner and outer flanges and said distances (a) and (c) are measured from the inner and outer flanges of the rim.

8. An apparatus as set forth in claim 6, further comprising a display connected to the computer that displays the impressing depth computed by the computer.

9. An apparatus as set forth in claim 8, wherein the display exhibits an absolute value of the impressing depth.

10. An apparatus as set forth in claim 8, wherein the display optionally exhibits one of the front and rear axles of the vehicle.

* * * * *